US011641124B2

(12) United States Patent
Wu et al.

(10) Patent No.: US 11,641,124 B2
(45) Date of Patent: May 2, 2023

(54) ELECTRONIC DEVICE AND CHARGING METHOD THEREOF

(71) Applicant: ASUSTeK COMPUTER INC., Taipei (TW)

(72) Inventors: Tsung-Han Wu, Taipei (TW); Wei-Gen Chung, Taipei (TW); Yi-Ming Huang, Taipei (TW); Chien-Chung Lo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 639 days.

(21) Appl. No.: 15/923,252

(22) Filed: Mar. 16, 2018

(65) Prior Publication Data

US 2018/0278082 A1   Sep. 27, 2018

(30) Foreign Application Priority Data

Mar. 22, 2017 (TW) ................................ 106109589

(51) Int. Cl.
*H02J 7/00* (2006.01)
*H02J 7/06* (2006.01)

(52) U.S. Cl.
CPC ...... *H02J 7/007182* (2020.01); *H02J 7/0071* (2020.01); *H02J 7/06* (2013.01); *H02J 7/00034* (2020.01); *H02J 7/00045* (2020.01)

(58) Field of Classification Search
CPC .. H02J 7/0045; H02J 7/007182; H02J 7/0071; H02J 7/06; H02J 7/00034; H02J 7/00045
USPC ........................................................ 320/107
See application file for complete search history.

(56) References Cited

U.S. PATENT DOCUMENTS

| | | | | |
|---|---|---|---|---|
| 4,644,182 A | * | 2/1987 | Kawashima | G11C 5/145 327/263 |
| 6,194,871 B1 | * | 2/2001 | Haraguchi | H02J 7/0031 320/134 |
| 9,866,229 B2 | * | 1/2018 | Huang | H02M 3/00 |
| 9,966,942 B2 | * | 5/2018 | Pritelli | B60L 3/12 |
| 10,044,204 B2 | * | 8/2018 | Hu | H02J 7/022 |

(Continued)

FOREIGN PATENT DOCUMENTS

| | | | | |
|---|---|---|---|---|
| CN | 104993562 A | | 10/2015 | |
| CN | 109904884 A | * | 6/2019 | ............ H01M 10/44 |

(Continued)

*Primary Examiner* — M Baye Diao
(74) *Attorney, Agent, or Firm* — McClure, Qualey & Rodack, LLP

(57) ABSTRACT

Provided is an electronic device configured to be charged with an adapter. The electronic device includes an energy storage unit, a charging unit and a switch unit. The charging unit is configured to receive a bus voltage and output a charging voltage to charge the energy storage unit. The switch unit is electrically coupled in parallel to the charging unit. When the electronic device is coupled to the adapter through a bus interface, the electronic device receives the bus voltage from the adapter, receives a communication signal from the adapter, and selectively turns on or off the switch unit according to the communication signal, and when the electronic device operates in a direct charging mode, the switch unit is turned on to form a direct charging path, to charge the energy storage unit by using the bus voltage.

10 Claims, 5 Drawing Sheets

(56) References Cited

U.S. PATENT DOCUMENTS

| | | | | |
|---|---|---|---|---|
| 10,056,779 B2* | 8/2018 | Hu | | H02J 7/007182 |
| 10,389,164 B2* | 8/2019 | Tian | | H02J 7/007192 |
| 10,574,073 B2* | 2/2020 | Han | | H02J 1/10 |
| 2004/0109274 A1* | 6/2004 | Sato | | H02J 7/0031 |
| | | | | 361/90 |
| 2005/0084745 A1* | 4/2005 | Colello | | G01R 31/396 |
| | | | | 429/61 |
| 2012/0229945 A1* | 9/2012 | Sakurai | | H02J 7/0031 |
| | | | | 361/86 |
| 2013/0307480 A1* | 11/2013 | Boggs | | B60L 58/10 |
| | | | | 320/118 |
| 2014/0217988 A1* | 8/2014 | Koike | | H02J 7/0021 |
| | | | | 320/134 |
| 2015/0069958 A1* | 3/2015 | Yang | | H02J 7/007 |
| | | | | 320/107 |
| 2016/0105038 A1* | 4/2016 | Chi | | H02J 7/007 |
| | | | | 320/107 |
| 2017/0005499 A1* | 1/2017 | Zhang | | H02J 7/0045 |
| 2017/0040804 A1 | 2/2017 | Hu et al. | | |
| 2017/0040814 A1* | 2/2017 | Hu | | H02J 7/045 |
| 2017/0040817 A1* | 2/2017 | Hu | | H02J 7/00038 |
| 2017/0201104 A1* | 7/2017 | Jin | | H01M 10/425 |
| 2017/0244239 A1* | 8/2017 | Jin | | H02J 7/008 |
| 2017/0294789 A1* | 10/2017 | Helenius | | H02J 7/0027 |
| 2018/0006479 A1* | 1/2018 | Daniel | | H02J 7/342 |
| 2018/0048170 A1* | 2/2018 | Sun | | H02J 7/00 |
| 2018/0254648 A1* | 9/2018 | Harju | | H02J 7/0072 |
| 2018/0331612 A1* | 11/2018 | Zhang | | H02M 3/33523 |
| 2018/0366945 A1* | 12/2018 | Braginsky | | H02J 3/381 |

FOREIGN PATENT DOCUMENTS

| | | |
|---|---|---|
| TW | M537760 U | 3/2017 |
| WO | WO-2018032274 A1 * | 2/2018 .......... H02J 7/00036 |

* cited by examiner

ELECTRONIC DEVICE AND CHARGING METHOD THEREOF

CROSS-REFERENCE TO RELATED APPLICATIONS

The application claims the priority benefit of Taiwan application serial No. 106109589, filed on Mar. 22, 2017. The entirety of the above-mentioned patent application is hereby incorporated by reference herein and made a part of specification.

TECHNICAL FIELD

The disclosure relates to an electronic device and a charging method thereof, and in particular, to an electronic device that supports direct charging and a charging method thereof.

RELATED ART

As the effectiveness of various electronic devices is improved, to shorten time required for charging a battery of an electronic device, various fast charge or discharge circuit architectures appear in the market.

However, if a charge protection and monitoring mechanism of software fails due to a system crash and a direct charging path in an electronic device has not been turned off, insertion of an adapter is likely to cause damage to the adapter, the charging cable and even a battery component in the electronic device.

SUMMARY

An aspect of the disclosure is an electronic device. The electronic device is configured to be charged with an adapter. The electronic device includes an energy storage unit, a charging unit and a switch unit. The charging unit is configured to receive a bus voltage and output a charging voltage to charge the energy storage unit. The switch unit is electrically coupled in parallel to the charging unit. When the electronic device is coupled to the adapter through a bus interface, the electronic device receives the bus voltage from the adapter, receives a communication signal from the adapter, and selectively turns on or off the switch unit according to the communication signal, and when the electronic device operates in a direct charging mode, the switch unit is turned on to form a direct charging path, to charge the energy storage unit by using the bus voltage. When the electronic device is disconnected from the adapter, the switch unit is turned off according to the communication signal, to disconnect the direct charging path.

Another aspect of the disclosure is a charging method. The charging method includes: coupling an adapter to an electronic device through a bus interface, identifying whether the adapter supports direct charging, and controlling the electronic device to operate in a general charging mode or a direct charging mode; receiving a bus voltage through the bus interface by a charging unit in the electronic device and converting the bus voltage into a charging voltage to charge an energy storage unit in the electronic device when the electronic device operates in the general charging mode; outputting an on/off switching signal to turn on a switch unit by a charge switching circuit to form a direct charging path and charging the energy storage unit by the bus voltage when the electronic device operates in the direct charging mode; and outputting a corresponding on/off switching signal to turn off the switch unit by the charge switching circuit to disconnect the direct charging path when the electronic device is disconnected from the adapter.

DETAILED DESCRIPTION

In the disclosure, when referred to as "connected" or "coupled", a component means "electrically connected" or "electrically coupled". "connected" or "coupled" also is used to indicate that two or more components collocate to operate or interact with each other. In addition, although the disclosure uses terms such as "first" and "second" to describe different components, the terms are only used to differentiate components or operations that are described in a same technical term. unless otherwise indicated clearly in the context, the terms are not specially referred or do not imply order or rank, and are also not used to limit the disclosure.

Figure 1:
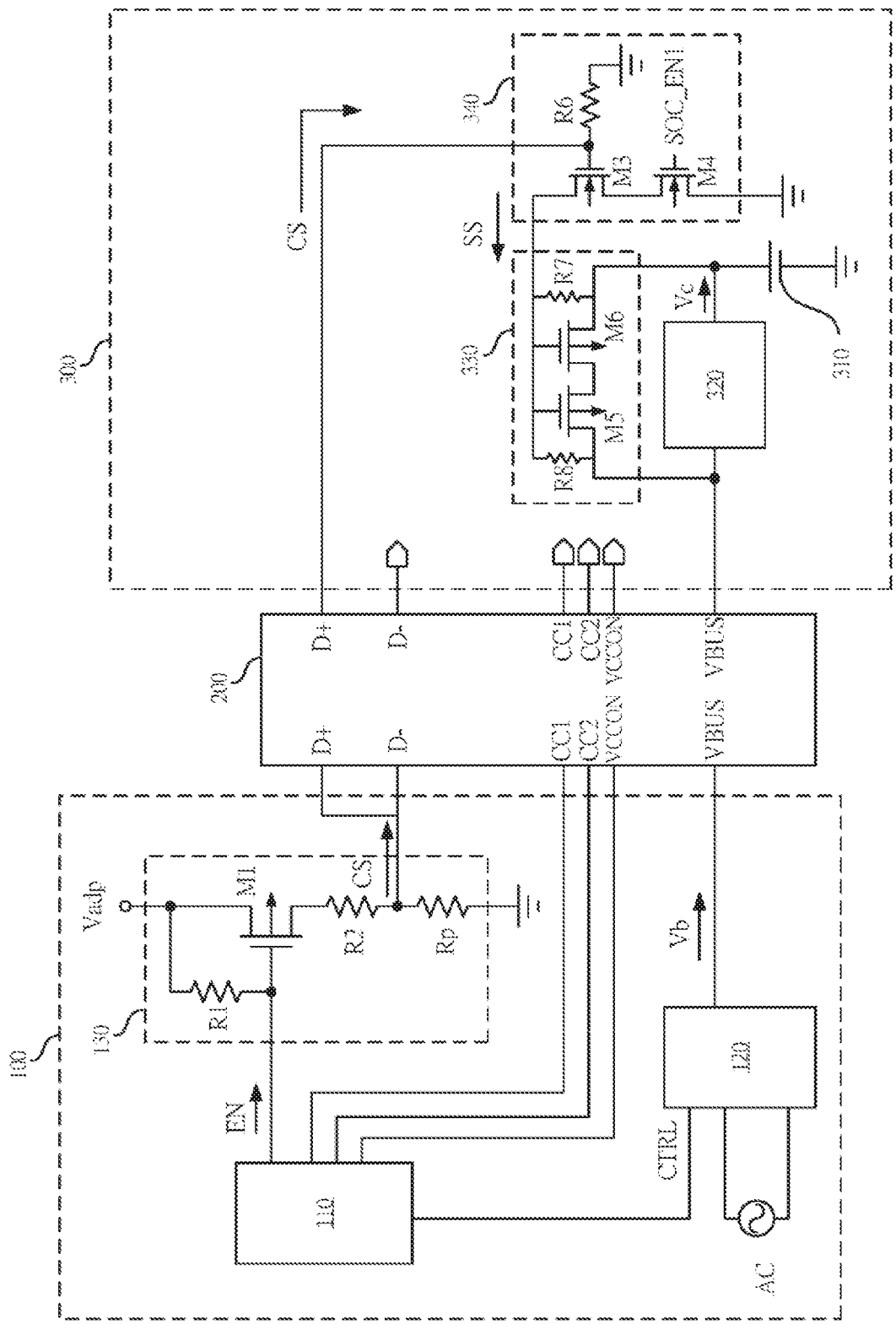
FIG. 1 is a schematic diagram of a charging architecture according to an embodiment of the disclosure.

Refer to FIG. 1. FIG. 1 is a schematic diagram of a charging architecture according to an embodiment of the disclosure. In this embodiment, the charging architecture includes an adapter 100, a bus interface 200 and an electronic device 300. In this embodiment, the electronic device 300 includes an energy storage component, and is charged with the adapter 100 through the bus interface 200, to supply electric energy required by the electronic device 300. In an embodiment, the electronic device 300 may include a smartphone, a tablet computer, and so on. In an embodiment, the bus interface 200 is a USB (Universal Serial Bus) Type-C or a USB of another standard.

As shown in FIG. 1, in this embodiment, the adapter 100 includes a control unit 110, a converter 120 and a starting circuit 130. The control unit 110 is electrically coupled to the converter 120 and the starting circuit 130. The control unit 110 is electrically coupled to corresponding pins CC1, CC2 and VCONN in the bus interface 200. The converter 120 is electrically coupled to a corresponding pin VBUS in the bus interface 200. The starting circuit 130 is electrically coupled to corresponding pins D+ and D− in the bus interface 200.

In this embodiment, the starting circuit 130 includes a resistor R1, a switch M1, a resistor R2 and a resistor RP. A first terminal of the resistor R1 is electrically coupled to a first terminal of the switch M1 and a voltage source Vadp, and a second terminal of the resistor R1 is electrically coupled to a control terminal of the switch M1 and the control unit 110. A second terminal of the switch M1 is electrically coupled to a first terminal of the resistor R2. A second terminal of the resistor R2 is electrically coupled to a first terminal of the resistor RP. A second terminal of the resistor RP is electrically coupled to a ground terminal of the adapter 100.

In this embodiment, the control unit 110 is configured to output a control signal CTRL to the converter 120, so that the converter 120 converts an alternating current input voltage AC into a direct current bus voltage Vb according to the control signal CTRL and outputs the direct current bus voltage Vb to the corresponding pin VBUS in the bus interface 200. In addition, the adapter 100 also outputs a handshake control signal through the control unit 110. In this way, when the adapter 100 and the electronic device 300 are electrically coupled to each other through the bus interface 200, handshake identification between the adapter 100 and the electronic device 300 is performed by transmitting the handshake control signal. In an embodiment, the adapter 100 and the electronic device 300 performs the handshake identification by transmitting the handshake control signal through the pins such as CC1, CC2 and VCONN of the USB Type-C, but the disclosure is not limited thereto. In an embodiment, the handshake identification alternatively is performed through the pins CC1 or CC2.

After the adapter 100 and the electronic device 300 complete the handshake identification, the adapter 100 outputs an enabling signal EN through the control unit 110 to turn on the switch M1 in the starting circuit 130 according to a request instruction from the electronic device 300, so that a voltage level of the second terminal of the resistor R2 is correspondingly increased to an enabling level as a communication signal CS, and is transmitted to the electronic device 300 through the corresponding pins D+ and D− in the bus interface 200. In an embodiment, the switch M1 is implemented by a P-type metal-oxide semiconductor (PMOS) field-effect transistor, and a voltage level of the enabling signal EN is a low level.

In this embodiment, the electronic device 300 includes an energy storage unit 310, a charging unit 320, a switch unit 330 and a charge switching circuit 340. In an embodiment, the energy storage unit 310 is a battery or another suitable energy storage component.

A first terminal of the charging unit 320 is electrically coupled to the corresponding pin VBUS in the bus interface 200. A second terminal of the charging unit 320 is electrically coupled to a first terminal of the energy storage unit 310. A second terminal of the energy storage unit 310 is electrically coupled to a ground terminal of the electronic device 300.

As shown in FIG. 1, a first terminal of the switch unit 330 is electrically coupled to the first terminal of the charging unit 320, and a second terminal of the switch unit 330 is electrically coupled to the second terminal of the charging unit 320, so that the switch unit 330 is electrically coupled in parallel to the charging unit 320. In this embodiment, the switch unit 330 includes resistors R7 and R8 and switches M5 and M6. First terminals of the resistors R7 and R8 and control terminals of the switches M5 and M6 are electrically coupled to a control terminal of the switch unit 330. A first terminal of the switch M5 and a second terminal of the resistor R8 are electrically coupled to the first terminal of the switch unit 330. A second terminal of the switch M5 is electrically coupled to a first terminal of the switch M6. A second terminal of the switch M6 and a second terminal of the resistor R7 are electrically coupled to the second terminal of the switch unit 330. In an embodiment, the switches M5 and M6 are implemented by PMOS field-effect transistors.

As shown in FIG. 1, the charge switching circuit 340 is electrically coupled to the switch unit 330. In this embodiment, the charge switching circuit 340 includes a first switch M3, a second switch M4 and a resistor R6. A first terminal of the first switch M3 is electrically coupled to the control terminal of the switch unit 330, to output an on/off switching signal SS. A control terminal of the first switch M3 is electrically coupled to the corresponding pin D+ in the bus interface 200, to receive the communication signal CS. A first terminal of the second switch M4 is electrically coupled to a second terminal of the first switch M3. A second terminal of the second switch M4 is electrically coupled to the ground terminal of the electronic device 300. A control terminal of the second switch M4 is configured to receive an enabling signal SOC_EN1. A first terminal of the resistor R6 is electrically coupled to the control terminal of the first switch M3, and a second terminal of the resistor R6 is electrically coupled to the ground terminal. In an embodiment, the first switch M3 and the second switch M4 are implemented by N-type metal-oxide semiconductor (NMOS) field-effect transistors.

When the electronic device 300 is coupled to the adapter 100 through the bus interface 200, the electronic device 300 receives the bus voltage Vb from the adapter 100. In an embodiment, in a general charging mode of the electronic device 300, the charging unit 320 receives the bus voltage Vb output by the converter 120 from the corresponding pin VBUS on the bus interface 200, and converts the bus voltage Vb into a charging voltage Vc, to output the charging voltage Vc to charge the energy storage unit 310. In an embodiment, the charging unit 320 includes various battery charger integrated circuits (ICs), so that a voltage level of the charging voltage Vc matches the energy storage unit 310.

In an embodiment, the electronic device 300 and the adapter 100 transmit the handshake control signal through the bus interface 200, to control the electronic device 300 to operate in a direct charging mode. After the adapter 100 and the electronic device 300 complete the handshake identification, and when the electronic device 300 determines that the adapter 100 supports the direct charging mode, the electronic device 300 outputs the corresponding enabling signal SOC_EN1, so that the second switch M4 is turned on according to the enabling signal SOC_EN1 received by the control terminal of the second switch M4. The electronic device 300 transmits a corresponding instruction to the adapter 100 through the bus interface 200. The adapter 100 outputs the enabling signal EN through the control unit 110 to turn on the switch M1 in the starting circuit 130 according to the request instruction from the electronic device 300, so that the voltage level of the second terminal of the resistor R2 is correspondingly increased to the enabling level as the communication signal CS, and is transmitted to the electronic device 300 through the bus interface 200. When the control terminal of the first switch M3 in the charge switching circuit 340 receives the communication signal CS from the adapter 100 through the pin D+ in the bus interface 200, the first switch M3 is correspondingly turned on.

When the first switch M3 and the second switch M4 in the charge switching circuit 340 are turned on at the same time, the control terminal of the switch unit 330 is decreased to the enabling level (for example, the low level), so that the switches M5 and M6 implemented by PMOS field-effect transistors in the switch unit 330 are correspondingly turned on. When the electronic device 300 is coupled to the adapter 100, the charge switching circuit 340 receives the communication signal CS from the adapter 100 through the bus interface 200, to output a corresponding on/off switching signal SS to selectively turn on or off the switch unit 330. When the switch unit 330 is turned on, the switch unit 330 forms a direct charging path, and bypasses the charging unit 320. Therefore, the bus voltage Vb does not need to be converted by the charging unit 320, and can be directly used to charge the energy storage unit 310.

By means of operation of the first switch M3 and the second switch M4, the charge switching circuit 340 controls on and off of the switch unit 330 by outputting an on/off switching signal SS, so that when the electronic device 300 operates in the direct charging mode, the switch unit 330 is turned on to form the direct charging path, to charge the energy storage unit 310 by using the bus voltage Vb.

When the electronic device 300 is disconnected from the adapter 100, voltage levels of the pins D+ and D− of the bus interface 200 are automatically correspondingly switched to low levels, so that the first switch M3 in the charge switching circuit 340 is correspondingly turned off. When the first switch M3 is turned off, the charge switching circuit 340 outputs a corresponding on/off switching signal SS to turn off the switch unit 330, to disconnect the direct charging path.

In this way, even if another adapter is electrically coupled to the electronic device 300 through the bus interface 200, the electronic device 300 operates in the general charging mode before the charging capability of the adapter is determined by means of handshake identification because the direct charging path has been disconnected, and the bus voltage Vb is adjusted by the charging unit 320, to output the charging voltage Vc to charge the energy storage unit 310, thereby avoiding damage to the circuit or components caused by directly charging the energy storage unit 310 with an excessively high bus voltage Vb.

The electronic device 300 avoids the problem that when an adapter having a different charging capability is inserted/removed, the charging circuit turns on the direct charging path and incorrectly operates in the direct charging mode due to a handshake identification failure in a system or software control abnormality.

Figure 2:
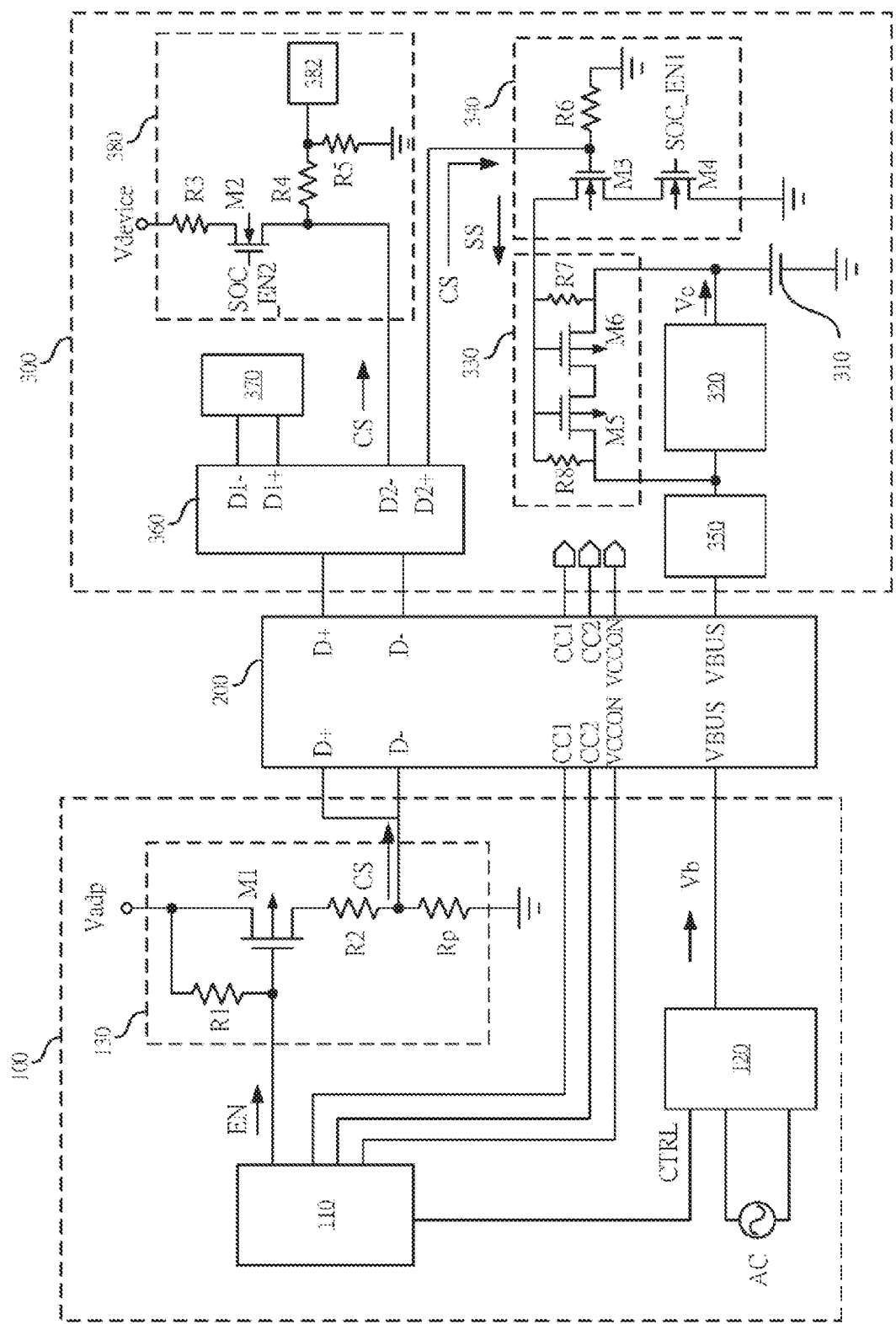
FIG. 2 is a schematic diagram of a charging architecture according to another embodiment of the disclosure.

Refer to FIG. 2. FIG. 2 is a schematic diagram of a charging architecture according to another embodiment of the disclosure. In this embodiment, the electronic device 300 further includes an overvoltage protection unit 350, a bus converter 360, a control circuit 370 and an identification circuit 380. In FIG. 2, similar components related to the embodiment of FIG. 1 are denoted by same reference numerals for the ease of understanding, and the specific principles of the similar components have been described in detail above. The components in FIG. 1 except for those having a cooperative operation relationship with the components in FIG. 2 will be not described herein again.

In this embodiment, the overvoltage protection unit 350 is electrically coupled between the pin VBUS of the bus interface 200 and the charging unit 320, so that the bus voltage Vb is transmitted to the charging unit 320 and the switch unit 330 through the overvoltage protection unit 350. When the bus voltage Vb output by the adapter 100 exceeds a safety upper limit of the electronic device 300, the overvoltage protection unit 350 performs corresponding overvoltage protection, that is, turn off the current path to protect components and circuits in the electronic device 300.

In this embodiment, an input terminal of the bus converter 360 is electrically coupled to the pins D+ and D− of the bus interface 200, and is configured to receive the communication signal CS from the bus interface 200. A first output terminal D1 of the bus converter 360 is electrically coupled to the control circuit 370. A pin D2+ of a second output terminal of the bus converter 360 is electrically coupled to the charge switching circuit 340, and a pin D2− of the second output terminal of the bus converter 360 is electrically coupled to the identification circuit 380.

In this embodiment, when the electronic device 300 is electrically coupled to the adapter 100, the bus converter 360 switches to turn on the first output terminal, and the communication signal CS output by the adapter 100 is transmitted to the control circuit 370 through the bus converter 360. The control circuit 370 receives the communication signal CS through the first output terminal of the bus converter 360, and identifies a charging specification of the adapter 100. In an embodiment, the control circuit 370 identifies USB Battery Charge 1.2 (BC1.2) through the voltage levels of the pins D+ and D−.

After the control circuit 370 identifies the charging specification of the adapter 100, the bus converter 360 performs switching to turn on the second output terminal, so that the communication signal CS output by the adapter 100 is transmitted to the charge switching circuit 340 through the bus converter 360 to perform the foregoing operations.

In an embodiment, after the control circuit 370 identifies the charging specification of the adapter 100, the communication signal CS output by the adapter 100 is further transmitted to the identification circuit 380 through the bus converter 360. The identification circuit 380 is configured to identify the adapter 100.

As shown in FIG. 2, the identification circuit 380 includes a switch M2, resistors R3, R4 and R5, and a converter unit 382. A first terminal of the resistor R3 is configured to receive a voltage source Vdevice. A second terminal of the resistor R3 is electrically coupled to a first terminal of the switch M2. A control terminal of the switch M2 is configured to receive an enabling signal SOC_EN2. A second terminal of the switch M2 is electrically coupled to a first terminal of the resistor R4. A second terminal of the resistor R4 is electrically coupled to the converter unit 382 and a first terminal of the resistor R5. A second terminal of the resistor R5 is electrically coupled to the ground terminal of the electronic device 300.

When the identification circuit 380 identifies the adapter 100, the enabling signal SOC_EN2 turns on the switch M2, so that the converter unit 382 reads the pin D− of the bus interface 200 through the bus converter 360, to detect a division voltage caused by the resistor RP in the adapter 100 corresponding to the resistors R3, R4 and R5 to the voltage source Vadp. The converter unit 382 determines whether the adapter 100 is the adapter 100 that particularly matches the electronic device 300 according to a voltage level received by the converter unit 382.

Through the control circuit 370 and the identification circuit 380, the electronic device 300 further detects the charging specification supported by the adapter 100 or identifies a particular adapter 100, to cooperate with subsequent corresponding charging operations.

Figure 3:
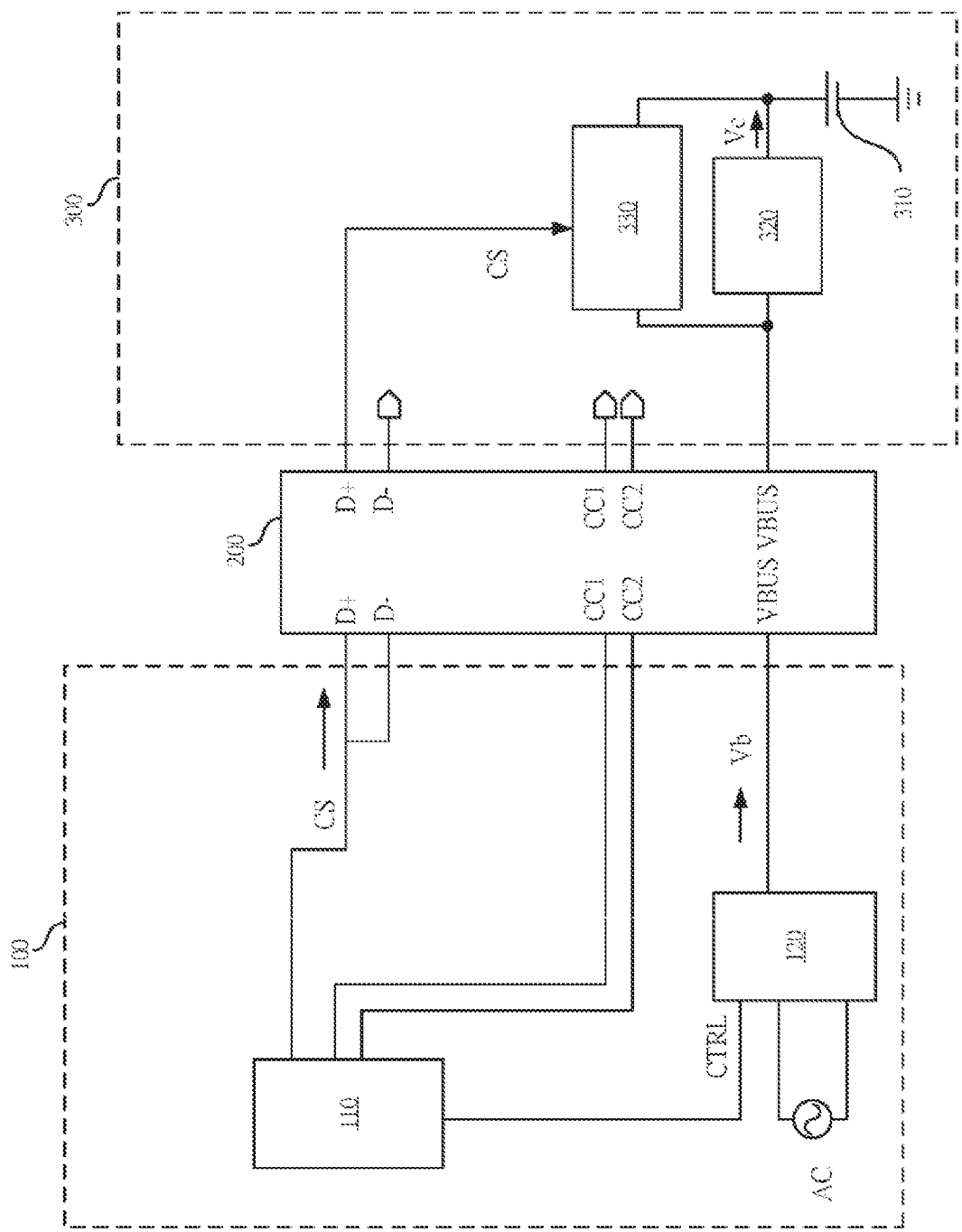
FIG. 3 is a schematic diagram of a charging architecture according to another embodiment of the disclosure.

Refer to FIG. 3. FIG. 3 is a schematic diagram of a charging architecture according to another embodiment of the disclosure. In FIG. 3, similar components related to the embodiment of FIG. 1 are denoted by same reference numerals for the ease of understanding, and the specific principles of the similar components have been described in detail above. The components in FIG. 1 except for those having a cooperative operation relationship with the components in FIG. 3 will not described herein again.

In this embodiment, the adapter 100 includes a control unit 110 and a converter 120. The control unit 110 outputs the communication signal CS to the corresponding pins D+ and D− in the bus interface 200 directly after completing the handshake identification, and no additional starting circuit needs to be disposed in the adapter 100. In this embodiment, the electronic device 300 selectively turns on or off the switch unit 330 directly through the communication signal CS.

In this embodiment, after receiving the communication signal CS from the adapter 100, the electronic device 300 selectively turns on or off the switch unit 330 according to the communication signal CS, so that when the electronic device 300 operates in the direct charging mode, the switch unit 330 is turned on to form the direct charging path, to charge the energy storage unit 310 by using the bus voltage Vb.

Figure 4:
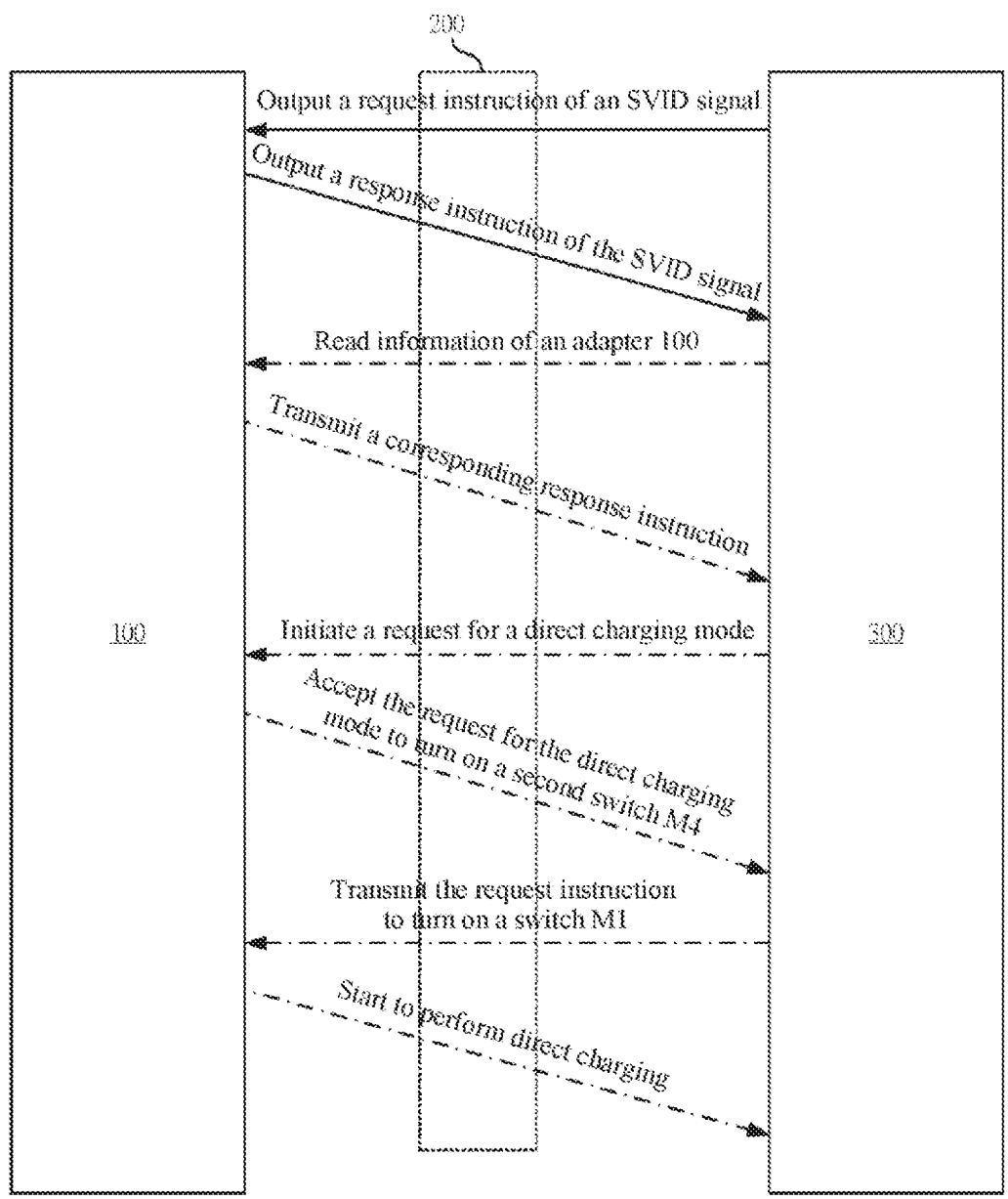
FIG. 4 is a schematic diagram of a communication process between an adapter and an electronic device according to an embodiment of the disclosure.

Refer to FIG. 4. FIG. 4 is a schematic diagram of a communication process between an adapter 100 and an electronic device 300 according to an embodiment of the disclosure. As shown in FIG. 4, in an embodiment, first the electronic device 300 outputs a request instruction of a subsystem-vendor identification (SVID) signal. After receiving the request instruction, the adapter 100 outputs a response instruction of the SVID. In an embodiment, the foregoing operations are implemented by a power delivery (PD) communication protocol in the USB Type-C.

After matching the adapter 100 by determining of the SVID, the electronic device 300 performs subsequent signal transmission through a vendor defined message (VDM) in the USB Type-C.

In an embodiment, the electronic device 300 reads information of the adapter 100 by the VDM transmitting the request instruction, and the adapter 100 transmits the corresponding response instruction to the electronic device 300. The electronic device 300 transmits a voltage and/or current signal and issues a request for the direct charging mode. When the adapter 100 accepts the request for the direct charging mode, the adapter 100 transmits the corresponding response instruction to the electronic device 300, so that the electronic device 300 outputs the enabling signal SOC_EN1 to the control terminal of the second switch M4 and turns on the enabling signal.

The electronic device 300 transmits the request instruction to the adapter 100, so that the control unit 110 outputs the enabling signal EN to the control terminal of the switch M1 and turns on the switch M1 in the starting circuit 130, or the control unit 110 directly outputs the communication signal CS to the corresponding pins D+ and D− in the bus interface 200. After the adapter 100 completes the corresponding operations, the direct charging path from the bus voltage Vb to the energy storage unit 310 is turned on, so that the electronic device 300 operates in the direct charging mode and starts to charge.

Figure 5:
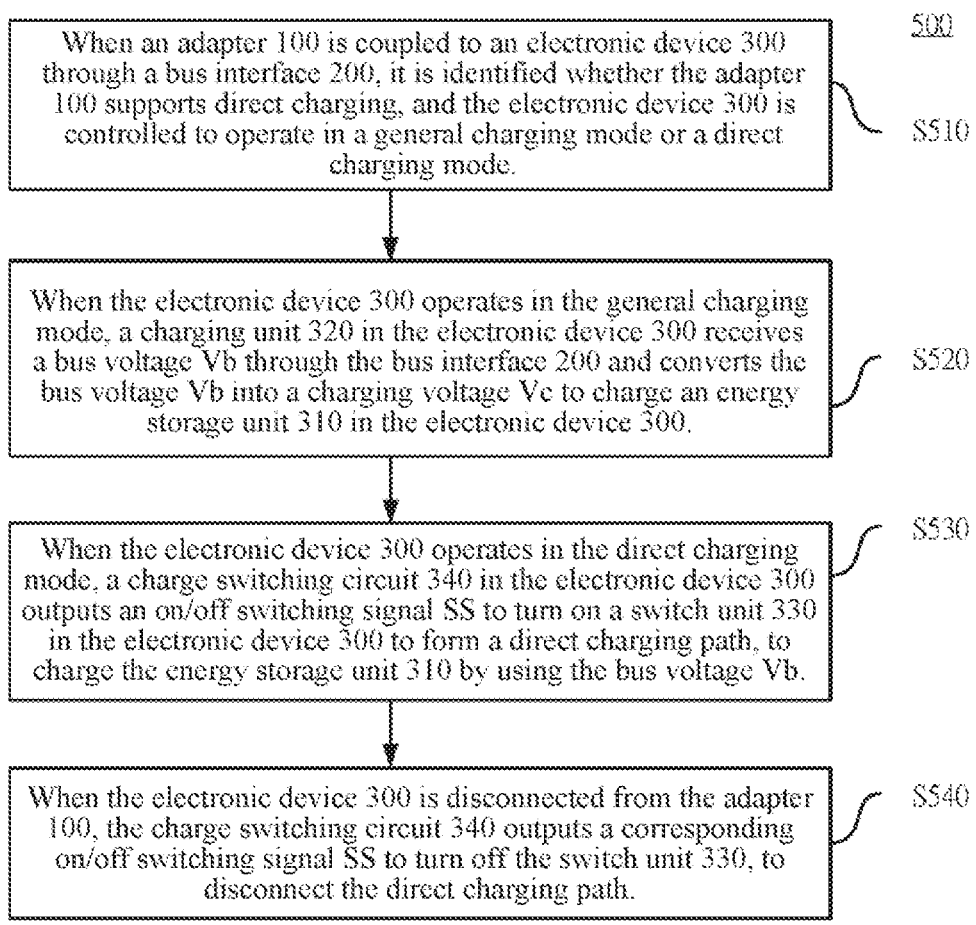
FIG. 5 is a flow chart of a charging method according to an embodiment of the disclosure.

Refer to FIG. 5. FIG. 5 is a flow chart of a charging method 500 according to an embodiment of the disclosure. For convenience and clarity of description, the charging method 500 described below is described with reference to the embodiments shown in FIG. 1 to FIG. 4, but not limited thereto. Any person skilled in the art may make various changes and modifications thereto without departing from the spirit and scope of the disclosure. As shown in FIG. 5, the charging method 500 includes steps S510, S520, S530 and S540.

As shown in FIG. 5, in an embodiment, in the step S510, when the adapter 100 is coupled to the electronic device 300 through the bus interface 200, it is identified whether the adapter 100 supports direct charging, and the electronic device 300 is controlled to operate in a general charging mode or a direct charging mode.

In an embodiment, the step of identifying whether the adapter 100 supports direct charging includes performing the handshake identification between the adapter 100 and the electronic device 300 through the bus interface 200 transmitting the handshake control signal, and identifying whether the adapter 100 supports direct charging according to a result of the handshake identification.

In the step S520, when the electronic device 300 operates in the general charging mode, the charging unit 320 in the electronic device 300 receives the bus voltage Vb through the bus interface 200 and converts the bus voltage Vb into the charging voltage Vc to charge the energy storage unit 310 in the electronic device 300.

In the step S530, when the electronic device 300 operates in the direct charging mode, the charge switching circuit 340 in the electronic device 300 outputs the on/off switching signal SS to turn on the switch unit 330 in the electronic device 300 to form the direct charging path, to charge the energy storage unit 310 by using the bus voltage Vb.

In an embodiment, the step of forming the direct charging path in the step S530 includes: the adapter 100 outputting the communication signal CS when the result of the handshake identification identifies that the adapter 100 supports direct charging; the charge switching circuit 340 receiving the communication signal CS through the bus interface 200, and correspondingly turning on the first switch M3 in the charge switching circuit 340 according to the communication signal CS; turning on the second switch M4 in the charge switching circuit 340 according to the enabling signal SOC_EN1; and the charge switching circuit 340 outputting the corresponding on/off switching signal SS to turn on the switch unit 330 to form the direct charging path when the first switch M3 and the second switch M4 are turned on at the same time.

In the step S540, when the electronic device 300 is disconnected from the adapter 100, the charge switching circuit 340 outputs the corresponding on/off switching signal SS to turn off the switch unit 330, to disconnect the direct charging path.

A person of ordinary skill in the art may directly learn how the charging method 500 performs the operations and functions based on the adapter 100, the bus interface 200 and the electronic device 300 in the foregoing different embodiment. Therefore, details are not described herein. The electronic device 300 of the disclosure can switch between charging modes by using the foregoing charging method 500, to perform protection detection through a hardware circuit, turn off the switch unit 330 and disconnect the direct charging path when a charging cable between the adapter 100 and the electronic device 300 is removed.

In this way, damage to an adapter and charging cable due to overload caused by insertion of the adapter or charging cable into the electronic device 300 in the case that a charge protection monitoring mechanism fails and the direct charging path in the electronic device 300 has not been disconnected after the charging cable is removed, or the problem of shortened battery life or battery swelling due to charging of the battery component in the electronic device 300 in an overvoltage or overcurrent state, can be avoided.

Although the disclosure has been disclosed above in embodiments as above, they are not intended to limit the disclosure. Any person skilled in the art may make various modifications and variations thereto, without departing from the spirit and scope of the disclosure. Therefore, the protection scope of the disclosure is defined by the appended claims.

What is claimed is:

1. An electronic device, configured to be charged with an adapter, the electronic device comprising:
   an energy storage unit;
   a charging unit, configured to receive a bus voltage and output a charging voltage to charge the energy storage unit;

a switch unit, electrically coupled in parallel to the charging unit, wherein the switch unit comprises:
a first terminal;
a second terminal;
a first switch, wherein the first switch comprises a control end;
a second switch, wherein the second switch comprises a control end; and
two resistors, wherein each of the two resistors comprises a terminal, wherein the first switch is directly adjacent to the second switch, wherein the control end of the first switch, the control end of the second switch, and the terminals of each of the two resistor are electrically coupled to the first terminal of the switch unit; and
an overvoltage protection unit, comprising:
a first terminal electrically coupled to the adapter; and
a second terminal electrically coupled to the charging unit and the switch unit; wherein when the electronic device is coupled to the adapter through a bus interface, the electronic device receives the bus voltage from the adapter, receives a communication signal from the adapter, and selectively turns on or off the switch unit according to the communication signal, and when the electronic device operates in a direct charging mode, the switch unit is turned on to form a direct charging path to charge the energy storage unit by using the bus voltage, and when the electronic device is disconnected from the adapter, the switch unit is turned off according to the communication signal to disconnect the direct charging path via the first switch, the second switch, and the two resistors of the switch unit, wherein the overvoltage protection unit receives the bus voltage from the adapter and protects the charging unit and the switch unit from an overvoltage/overcurrent of the bus voltage.

2. The electronic device according to claim 1, further comprising:
a charge switching circuit, electrically coupled to the switch unit, and configured to receive the communication signal from the adapter through the bus interface, and output a corresponding on/off switching signal to selectively turn on or off the switch unit, wherein when the electronic device is disconnected from the adapter, the charge switching circuit outputs a corresponding on/off switching signal to turn off the switch unit so as to disconnect the direct charging path.

3. The electronic device according to claim 2, wherein the charge switching circuit comprises:
a third switch, comprising:
a first terminal, electrically coupled to a control terminal of the switch unit, to output the on/off switching signal;
a second terminal; and
a control terminal, configured to receive the communication signal.

4. The electronic device according to claim 3, wherein the charge switching circuit further comprises:
a fourth switch, comprising:
a first terminal, electrically coupled to the second terminal of the third switch;
a second terminal, electrically coupled to a ground terminal; and
a control terminal, wherein
when the electronic device operates in the direct charging mode, the fourth switch is turned on according to an enabling signal received by the control terminal.

5. The electronic device according to claim 2, further comprising:
a control circuit; and
a bus converter, comprising:
an input terminal, configured to receive the communication signal from the bus interface;
a first output terminal, electrically coupled to the control circuit; and
a second output terminal, electrically coupled to the charge switching circuit, wherein
when the electronic device is coupled to the adapter, the control circuit receives the communication signal through the first output terminal of the bus converter, and identifies a charging specification of the adapter.

6. The electronic device according to claim 5, further comprising:
an identification circuit, electrically coupled to the second output terminal of the bus converter, and configured to identify the adapter, wherein
after the control circuit identifies the charging specification of the adapter, the bus converter switches to turn on the first output terminal, and the identification circuit receives the communication signal through the second output terminal of the bus converter, to identify the adapter.

7. The electronic device according to claim 1, wherein the electronic device and the adapter further transmit a handshake control signal through the bus interface, to control the electronic device to operate in the direct charging mode.

8. A charging method, comprising:
coupling an adapter to an electronic device through a bus interface;
identifying whether the adapter supports direct charging; and
controlling the electronic device to operate in a general charging mode or a direct charging mode;
receiving a bus voltage through the bus interface and an overvoltage protection unit by a charging unit in the electronic device and converting the bus voltage into a charging voltage to charge an energy storage unit in the electronic device when the electronic device operates in the general charging mode, wherein a first terminal of the overvoltage protection unit is electrically coupled to the adapter, and a second terminal of the overvoltage protection unit is electrically coupled to the charging unit and a switch unit, wherein the overvoltage protection unit receives the bus voltage from the adapter and protects the charging unit and the switch unit from an overvoltage/overcurrent of the bus voltage, wherein the switch unit comprises a first terminal, a second terminal, a first switch, a second switch, and two resistors, wherein the first switch comprises a control end, wherein the second switch comprises a control end, wherein each of the two resistor comprises a terminal, wherein the first switch is directly adjacent to the second switch, wherein the control end of the first switch, the control end of the second switch, and the terminals of each of the two resistor are electrically coupled to the first terminal of the switch unit;
outputting an on/off switching signal to turn on the switch unit by a charge switching circuit to form a direct charging path, and charging the energy storage unit by the bus voltage when the electronic device operates in the direct charging mode; and
outputting a corresponding on/off switching signal to turn off the switch unit by the charge switching circuit to disconnect the direct charging path via the first switch, the second switch, and the two resistors of the switch unit when the electronic device is disconnected from the adapter.

9. The charging method according to claim 8, further comprising:

performing handshake identification between the adapter and the electronic device by transmitting a handshake control signal through the bus interface; and identifying whether the adapter supports direct charging according to a result of the handshake identification.

10. The charging method according to claim 9, further comprising:

outputting a communication signal by the adapter when the adapter is identified to support direct charging according to the result of the handshake identification;

receiving the communication signal through the bus interface by the charge switching circuit, and correspondingly turning on a third switch in the charge switching circuit according to the communication signal;

turning on a fourth s switch in the charge switching circuit according to an enabling signal; and outputting the corresponding on/off switching signal to turn on the switch unit to form the direct charging path by the charge switching circuit when the third switch and the fourth switch are turned on at the same time.

* * * * *